United States Patent
Claessens et al.

(10) Patent No.: US 10,031,307 B2
(45) Date of Patent: Jul. 24, 2018

(54) SPLITTER MODULE AND ENCLOSURE FOR USE THEREIN

(71) Applicant: CommScope Connectivity Belgium BVBA, Kesel-Lo (BE)

(72) Inventors: Bart Mattie Claessens, Hasselt (BE); Dirk Kempeneers, Aarschot (BE); Erwin Beckers, Werchter (BE)

(73) Assignee: COMMSCOPE CONNECTIVITY BELGIUM BVBA, Kessel-Lo (BE)

(*) Notice: Subject to any disclaimer, the term of this patent is extended or adjusted under 35 U.S.C. 154(b) by 0 days.

(21) Appl. No.: 15/301,621

(22) PCT Filed: Mar. 26, 2015

(86) PCT No.: PCT/EP2015/056493
§ 371 (c)(1),
(2) Date: Oct. 3, 2016

(87) PCT Pub. No.: WO2015/150204
PCT Pub. Date: Oct. 8, 2015

(65) Prior Publication Data
US 2017/0176701 A1    Jun. 22, 2017

Related U.S. Application Data

(60) Provisional application No. 61/974,627, filed on Apr. 3, 2014.

(51) Int. Cl.
G02B 6/00 (2006.01)
G02B 6/44 (2006.01)
G02B 6/38 (2006.01)

(52) U.S. Cl.
CPC .......... *G02B 6/445* (2013.01); *G02B 6/3897* (2013.01); *G02B 6/4446* (2013.01);
(Continued)

(58) Field of Classification Search
None
See application file for complete search history.

(56) References Cited

U.S. PATENT DOCUMENTS

| 6,983,095 B2 | 1/2006 | Reagan et al. |
| 7,088,899 B2 | 8/2006 | Reagan et al. |

(Continued)

FOREIGN PATENT DOCUMENTS

WO    2011/009060 A2    1/2011

OTHER PUBLICATIONS

International Search Report and Written Opinion of the International Searching Authority for corresponding International Publication No. PCT/EP2015/056493 dated Nov. 25, 2015, 18 pages.

*Primary Examiner* — Sung Pak
(74) *Attorney, Agent, or Firm* — Merchant & Gould P.C.

(57) ABSTRACT

An optical splitter module (140) can be carried on a cover (120) of an enclosure (100) between a contoured surface (129) and a row of optical adapters (130). Output pigtails (165) from the splitter module (140) are routed to the optical adapters (130). In certain examples, a significantly longer input fiber (161) is routed from the splitter module (140) to a splice region (114) at a base (110) of the enclosure (100). Certain types of splitter modules (140) are mounted to the cover (120) at an angle relative to an insertion axis for a feeder cable (170). A certain type of splitter module (140) curves about a minor axis (A2) so that one major surface (142) has a concave curvature and another major surface (143) has a convex curvature.

21 Claims, 8 Drawing Sheets

(52) U.S. Cl.
CPC .......... *G02B 6/4452* (2013.01); *G02B 6/4453* (2013.01); *G02B 6/4455* (2013.01)

(56) References Cited

U.S. PATENT DOCUMENTS

| | | |
|---|---|---|
| 7,103,255 B2 | 9/2006 | Reagan et al. |
| 7,146,089 B2 | 12/2006 | Reagan et al. |
| 7,171,102 B2 | 1/2007 | Reagan et al. |
| 7,200,317 B2 | 4/2007 | Reagan et al. |
| 7,369,741 B2 | 5/2008 | Reagan et al. |
| 7,397,997 B2 * | 7/2008 | Ferris .................. G02B 6/3897 385/134 |
| 7,400,815 B2 | 7/2008 | Mertesdorf et al. |
| 7,400,816 B2 | 7/2008 | Reagan et al. |
| 7,471,869 B2 | 12/2008 | Reagan et al. |
| 7,480,437 B2 | 1/2009 | Ferris et al. |
| 7,489,849 B2 * | 2/2009 | Reagan ................ G02B 6/4466 385/134 |
| 7,539,387 B2 | 5/2009 | Mertesdorf et al. |
| 7,539,388 B2 | 5/2009 | Mertesdorf et al. |
| 7,627,222 B2 | 12/2009 | Reagan et al. |
| 7,646,958 B1 | 1/2010 | Reagan et al. |
| 7,720,343 B2 | 5/2010 | Barth et al. |
| 7,751,675 B2 | 7/2010 | Holmberg et al. |
| 7,805,044 B2 | 9/2010 | Reagan et al. |
| 7,809,232 B2 | 10/2010 | Reagan et al. |
| 7,809,235 B2 | 10/2010 | Reagan et al. |
| 7,816,602 B2 | 10/2010 | Landry et al. |
| 7,844,161 B2 | 11/2010 | Reagan et al. |
| 7,873,255 B2 | 1/2011 | Reagan et al. |
| 7,941,027 B2 | 5/2011 | Mertesdorf et al. |
| 8,005,335 B2 | 8/2011 | Reagan et al. |
| 8,111,966 B2 | 2/2012 | Holmberg et al. |
| 8,121,458 B2 | 2/2012 | Barth et al. |
| 8,213,760 B2 | 7/2012 | Rudenick et al. |
| 8,224,145 B2 | 7/2012 | Reagan et al. |
| 8,263,861 B2 | 9/2012 | Landry et al. |
| 8,285,103 B2 | 10/2012 | Reagan et al. |
| 8,363,999 B2 | 1/2013 | Mertesdorf et al. |
| 8,374,476 B2 | 2/2013 | Reagan et al. |
| 8,569,618 B2 | 10/2013 | Landry et al. |
| 8,718,434 B2 | 5/2014 | Growall et al. |
| 8,837,894 B2 | 9/2014 | Holmberg et al. |
| 9,146,372 B2 | 9/2015 | Reagan et al. |
| 9,146,373 B2 | 9/2015 | Reagan et al. |
| 9,335,505 B2 | 5/2016 | Reagan et al. |
| 9,557,504 B2 | 1/2017 | Holmberg et al. |
| 9,678,292 B2 | 6/2017 | Landry et al. |
| 2005/0175307 A1 | 8/2005 | Battey et al. |
| 2005/0271344 A1 | 12/2005 | Grubish et al. |
| 2007/0147765 A1 | 6/2007 | Gniadek et al. |
| 2010/0284662 A1 | 11/2010 | Reagan et al. |
| 2010/0329625 A1 | 12/2010 | Reagan et al. |
| 2011/0013875 A1 * | 1/2011 | Bran de Leon ........ G02B 6/445 385/135 |
| 2012/0251063 A1 | 10/2012 | Reagan et al. |
| 2013/0209099 A1 | 8/2013 | Reagan et al. |
| 2013/0216187 A1 | 8/2013 | Dowling |
| 2015/0192741 A1 | 7/2015 | Dowling |
| 2016/0216467 A1 | 7/2016 | Reagan et al. |
| 2017/0023758 A1 | 1/2017 | Reagan et al. |
| 2017/0168256 A1 | 6/2017 | Reagan et al. |

\* cited by examiner

SPLITTER MODULE AND ENCLOSURE FOR USE THEREIN

CROSS-REFERENCE TO RELATED APPLICATION(S)

This application is a National Stage Application of PCT/EP2015/056493 filed on Mar. 26, 2015, which claims priority to U.S. Patent Application Ser. No. 61/974,627 filed on Apr. 3, 2014, and which applications are incorporated herein by reference. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

As demand for telecommunications increases, optical fiber services are being extended in more and more areas. To more efficiently extend the fiber optic service into areas where current and future customers are located, telecommunications enclosures are integrated throughout the network of telecommunications cables. Such enclosures provide connection locations where one or more optical fibers of the multi-fiber cable may be connected to end users/subscribers. Also, the enclosures are adapted to house and protect telecommunications components such as splices, termination panels, power splitters, and wavelength division multiplexers.

Improvements are Desired.

SUMMARY

In accordance with some aspects of the disclosure, a splitter module includes a housing; a splitter disposed within an interior of the housing; an input fiber coupled to the splitter; and output fibers coupled to the splitter. The input and output fibers extend out of the housing. The housing includes a first major surface and a second major surface. The housing has a major axis extending along the major surfaces from a first end of the housing to a second end of the housing. The housing also has a minor axis extending along the major surfaces orthogonal to the major axis. In certain examples, the housing is contoured about the minor axis.

In certain examples, the splitter extends along the major axis of the housing.

In certain examples, the housing includes a first part and a second part that cooperate to define the interior.

In certain examples, the minor axis of the housing extends between a connection end of the housing and an entry end of the housing. The input fiber enters the housing through the entry end. In an example, the input fiber is tangentially routed into the housing.

In certain examples, the housing includes a fiber routing spool arrangement disposed within the interior that enables the output fibers to exit the housing in at least two different directions. In certain examples, the output fibers exit the housing at an exit hole inwardly offset from the entry end of the housing.

In accordance with other aspects of the disclosure, an enclosure arrangement includes a base defining a splice region; and a cover coupled to the base to move between a closed position and an open position. The cover and the base cooperate to define an interior when the cover is in the closed position. The cover provides access to the interior when in the open position. Ruggedized adapters are disposed on the cover. Each ruggedized adapter has a first port accessible from an inner side of the cover and a second port accessible from an outer side of the cover. A splitter module is disposed at the inner side of the cover. Each splitter module includes a splitter disposed in a splitter housing. An input fiber coupled to one end of the splitter and a plurality of splitter output pigtails are coupled to another end the splitter. The input fiber is routed to the splice region of the base. The splitter output pigtails have connectorized ends.

In certain examples, the cover defines a pocket at the inner side. The splitter module is disposed in the pocket. In an example, the ruggedized adapters are disposed on the cover in a first row and a second row and the pocket is defined between the first row and the second row.

In certain examples, a second splitter module is carried by the cover. The second splitter module extends parallel to the first splitter module.

In certain examples, the ruggedized adapters are angled relative to the cover and the splitter module is angled relative to the cover.

In certain examples, the housing includes two major surfaces spaced from each other by a circumferential edge. The major surfaces have a major axis and a minor axis. The major surfaces are contoured about the minor axis.

In certain examples, the base defines an anchor location at which an input cable can be anchored. The enclosure arrangement also includes a gasket disposed at the base to enable ingress of the input cable and to inhibit ingress of contaminants. The cover is configured to cooperate with the base to activate the gasket.

In certain examples, a cable routing structure is carried by the cover to direct the input fiber from the splice region to the splitter module.

In certain examples, a length of each splitter output pigtail is shorter than a length of the input fiber.

In certain examples, the housing defines latch shoulders configured to engage latches disposed at the inner side of the cover.

In accordance with other aspects of the disclosure, a method of connecting a feeder fiber to a plurality of output fibers includes: routing the feeder fiber into an enclosure having a base and a cover; routing the feeder fiber to a splice region defined at an inner side of the base; mounting a splitter module to an inner side of the cover; routing an input fiber of the splitter module to the splice region; and plugging connectorized ends of splitter output pigtails into inner ports of ruggedized adapters on the cover. The splitter module, the ruggedized adapters, and the splitter output pigtails are carried together by the cover.

In certain examples, the method also includes splicing the feeder fiber to the input fiber at the splice region.

In certain examples, the method also includes activating a sealing arrangement by moving the cover relative to the base to a closed position.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, the disclosure relates to a splitter module and an enclosure in which the splitter module can be utilized.

Figure 1:
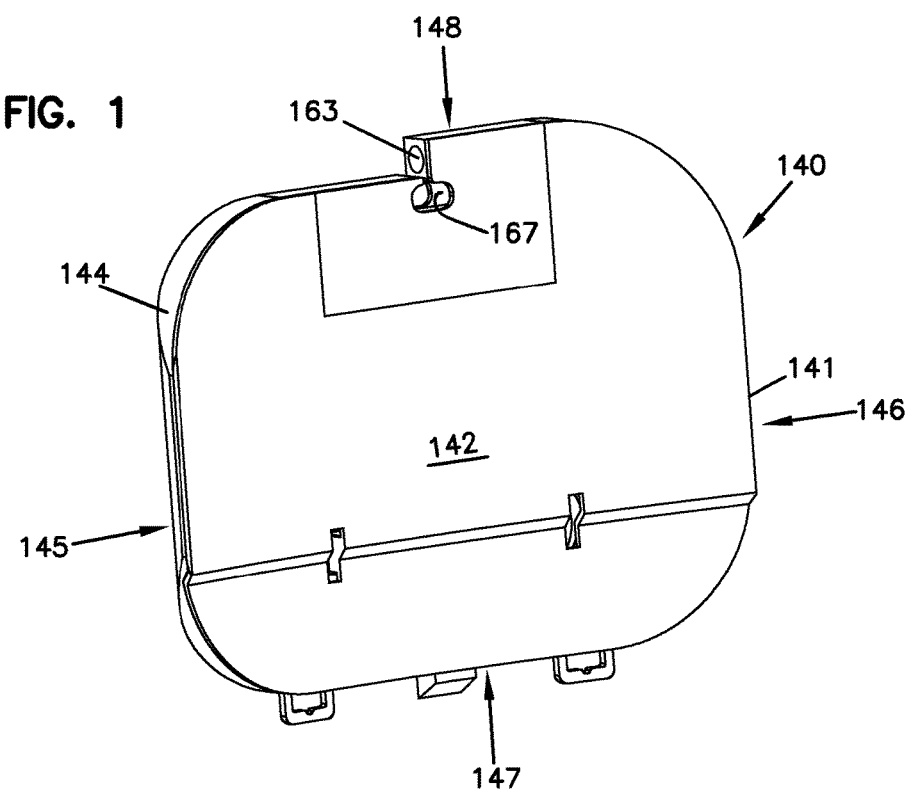
FIG. 1 is a perspective view of an example optical splitter module configured in accordance with the principles of the present disclosure.
Figure 4:
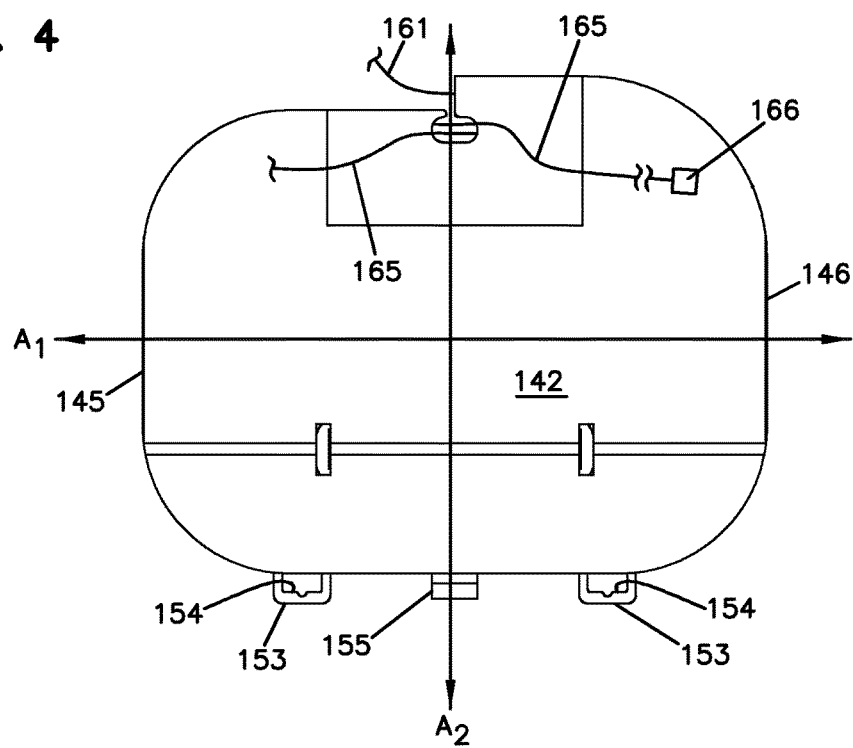
FIG. 4 is a front elevational view of the optical splitter module of FIG. 1.

FIG. 1 illustrates an example splitter module 140 configured to receive at least one input fiber 161 and a plurality of output pigtails 165 (see FIG. 4). The splitter module 140 includes a housing 141 enclosing an optical splitter 160 (see FIG. 6). Signals carried by the input fiber 161 are split (e.g., power split) onto the output pigtails 165 by the optical splitter 160. Each output pigtail 165 has a connectorized end 166 (see FIG. 4).

In some examples, the input fiber 161 has an unconnectorized end. In other examples, the input fiber 161 has a connectorized end.

Figure 2:
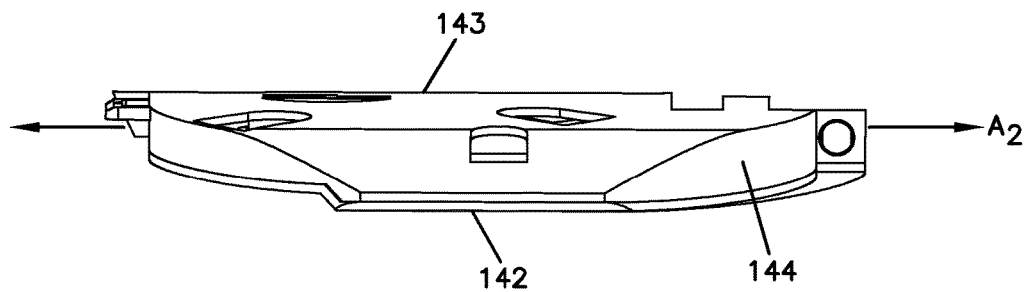
FIG. 2 is an end elevational view of the optical splitter module of FIG. 1.
Figure 3:
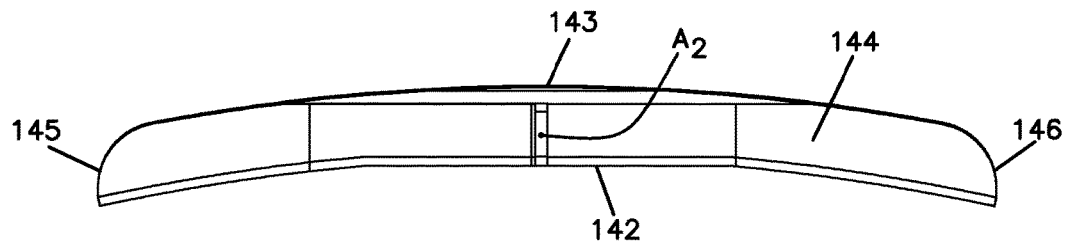
FIG. 3 is a top plan view of the optical splitter module of FIG. 1.

The splitter housing 141 has a first major surface 142 connected to a second major surface 143 by a circumferential edge (see FIGS. 1-3). The splitter housing 141 defines an interior 158 between the major surfaces 142, 143 (see FIG. 6). The housing 141 has a major axis A1 extending along the major surfaces 142, 143 from a first end 145 of the housing 141 to a second end 146 of the housing 141. The housing 141 also has a minor axis A2 extending along the major surfaces 142, 143 from a connection end 147 of the housing 141 to a free end 148 of the housing 141. The housing 141 is contoured about the minor axis A2 (see FIG. 3). For example, an intermediate region of the housing 141 is disposed farther rearward than the first and second ends 145, 146 of the housing 141 (see FIG. 3). In an example, the first major surface 142 has a concave curvature and the second major surface 143 has a convex curvature.

Figure 6:
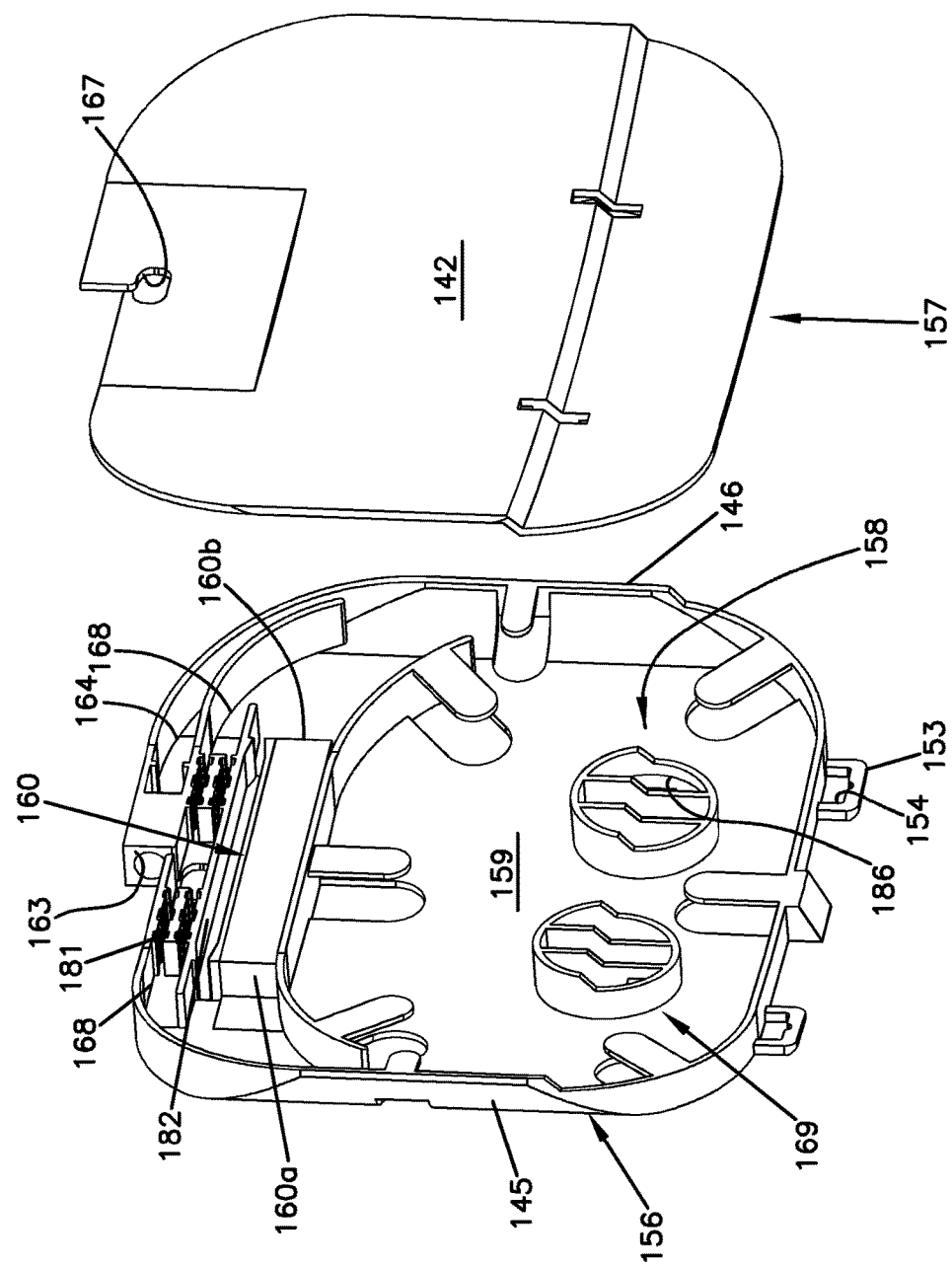
FIG. 6 is a front perspective view of the optical splitter module of FIG. 1 with a first part of a splitter housing exploded away from a second part of the splitter housing to expose an interior of the splitter housing.

As shown in FIG. 6, the interior 158 of the splitter housing 141 can include a splitter mounting region and a fiber routing region 159. In some implementations, the splitter mounting region is located closer to the free end 148 than the fiber routing region 159. In certain implementations, the splitter 160 extends parallel to the major axis A1 when the splitter 160 is disposed in the splitter mounting region. In certain examples, the splitter housing 141 defines an inlet opening 163 at the free end 148 of the housing 141; an outlet opening 167 is spaced inwardly from the inlet opening 163 (see FIG. 1). In the example shown, the splitter 160 is disposed between the fiber routing region 159 and the outlet opening 167. In other examples, however, the splitter 160 can be mounted anywhere within the interior 158 of the housing 141.

The inlet opening 163 provides access to an inlet channel 164 leading into the interior 158 of the splitter housing 141. The inlet channel 164 directs the input fiber 161 from the inlet opening 163 towards the fiber routing region 159. The fiber routing region 159 directs the input fiber 161 to a first end 160a of the splitter 160. In certain examples, the inlet opening 163 and inlet channel 164 are located and oriented to direct the input fiber 161 into the housing 141 along a tangential path. In certain examples, the input fiber 161 may be routed about an inner circumference of the splitter housing 141 between the inlet opening 163 and the splitter mounting region.

Output pigtails 165 are connected to a second end 160b of the splitter 160. The output pigtails 165 are routed from the second end 160b, through the routing region 159, to an outlet channel 168 that ends at the outlet opening 167. In certain examples, a grip member 181 can be disposed within the outlet channel 168 to organize and/or retain the output pigtails 165 at the outlet opening 167.

In certain implementations, two outlet channels 168 extends towards the outlet opening 167 from different (e.g., opposite) directions from the routing region 159. For example, a spool arrangement 169 may be disposed within the routing region 159. Some of the output pigtails 165 can be wound around the spool arrangement 169 to direct the output pigtails 165 to a first outlet channel 168; and others of the output pigtails 165 can be wound around the spool arrangement 169 to direct the output pigtails 165 to a second outlet channel 168. Accordingly, the output pigtails 165 can extend out through the outlet opening 167 in different directions. In an example, the spool arrangement 169 includes two spools (or other bend radius limiters) about which the output pigtails 165 can be wound to direct the output pigtails towards the outlet channels 168.

In certain implementations, the interior 158 of the splitter housing 141 also includes a splitter holder location 182 configured to retain a splice sleeve. The splitter holder location 182 enables a repair to be made to one of the fibers within the splitter module 140.

Figure 7:
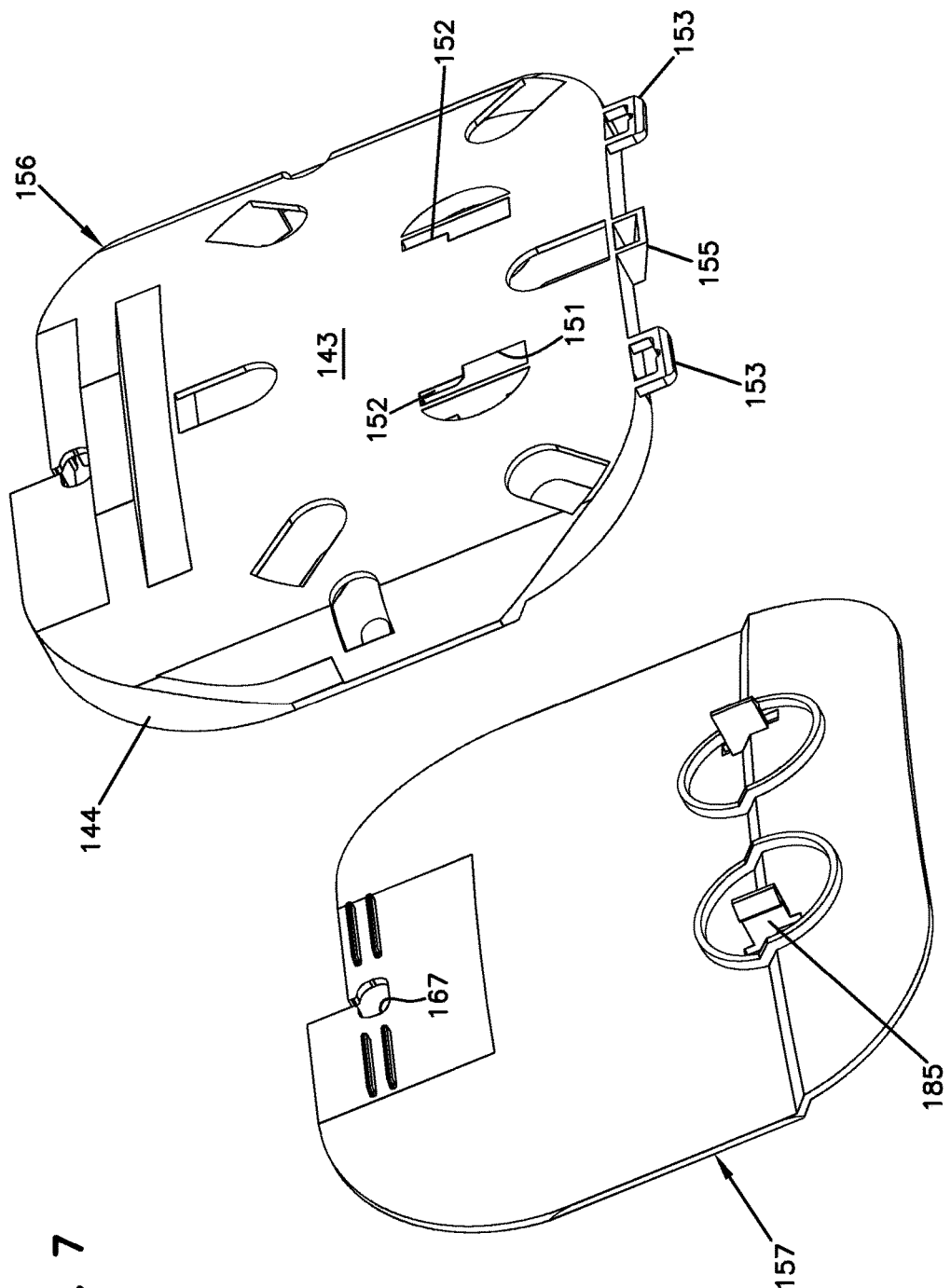
FIG. 7 is a rear perspective view of the optical splitter module of FIG. 6.
Figure 8:
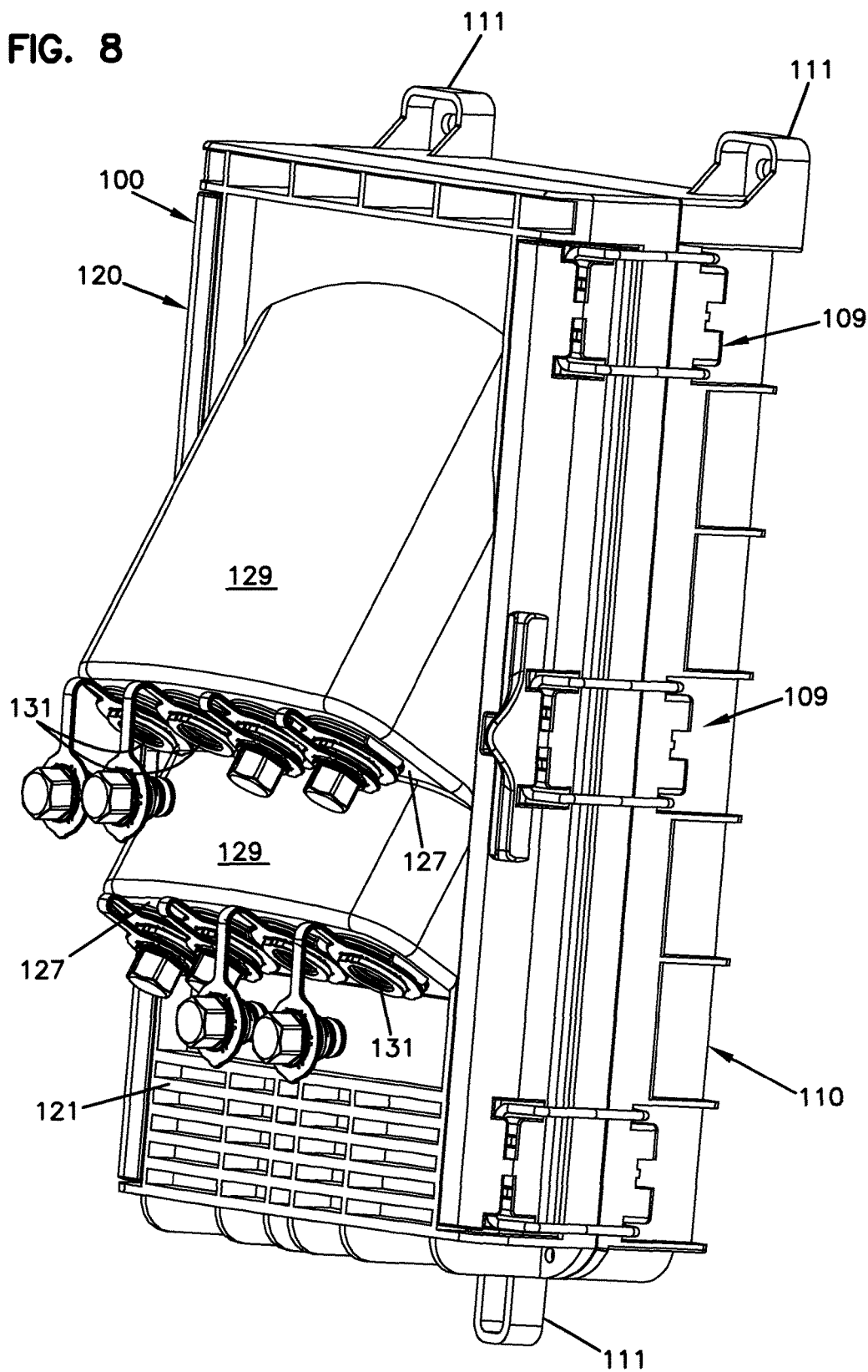
FIG. 8 is a perspective view of an example enclosure arrangement configured to carry one or more of the optical splitter modules of FIG. 1, the enclosure arrangement being arranged in the closed position.

As shown in FIGS. 6 and 7, the housing 141 includes a first part 156 and a second part 157 that cooperate to define the interior 158. In some implementations, the first part 156 defines one of the major surfaces 142, 143 and the circumferential edge 144; and the second part 157 defines the other of the major surfaces 142, 143. In other implementations, both parts 156, 157 may define the circumferential edge 144. In the example shown, the first part 156 defines the second major surface 143 and the circumferential edge 144; and the second part 157 defines the first major surface 142. In some implementations, the first part 156 is configured to carry the splitter 160 and the second part 157 covers an open side of the first part 156 to enclose the splitter 160. In certain implementations, the first part 156 defines the inlet and outlet channels 164, 168 and the routing region 159; and the second part 157 covers the open side of the first part 156 to enclose the channels 164, 168 and routing region 159.

In some implementations, various connecting structures hold the second part 157 to the first part 156. For example, in certain implementations, latching arms 185 may extends from one of the parts 156, 157 and engage recesses 186 defined in the other of the parts 156, 157. In certain examples, the latching arms 185 and recesses 186 are disposed at the routing region 159. In the example shown, the latching arms 185 extend from the second part 157 and engage recesses 186 defined in the spool arrangement 169 of the first part 156. In other implementations, the latch arms 185 and recesses 186 may be disposed anywhere on the parts 156, 157.

Figure 5:
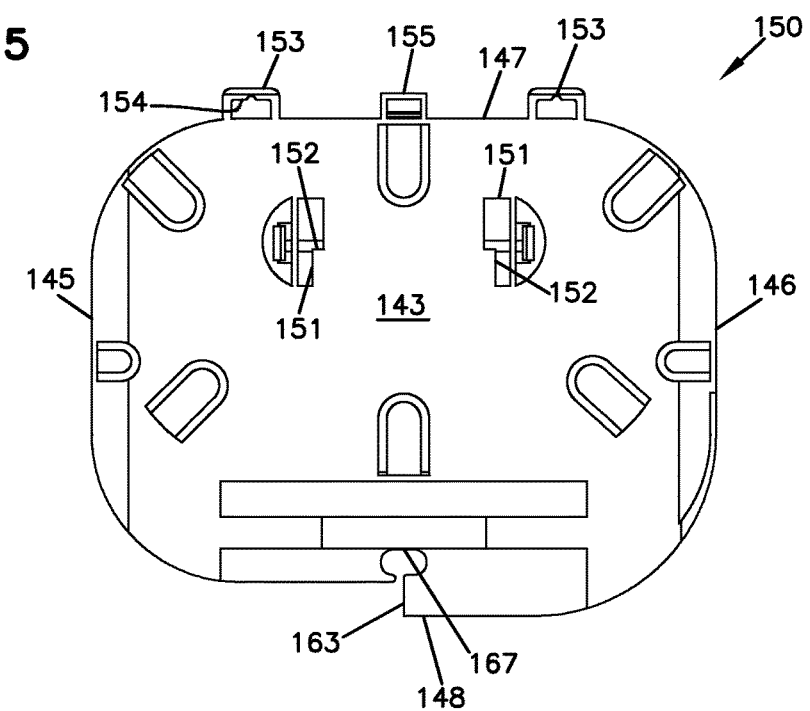
FIG. 5 is a rear elevational view of the optical splitter module of FIG. 1.

As shown in FIGS. 5 and 7, the splitter module 140 includes a splitter mounting arrangement 150 that aids in holding the splitter module 140 to an enclosure or other structure. In certain implementations, the splitter mounting arrangement 150 includes ledges 152 defined by one of the major surfaces 142, 143. In the example shown, the ledges 152 are defined by the second major surface 143 and are accessible through apertures 151 defined in the second major surface 143. For example, the ledges 152 may extend laterally into the apertures 151.

In certain implementations, the mounting arrangement 150 includes catches 153 that extend outwardly from the connection end 147 of the splitter housing 141. The catches 153 define abutment surfaces 154 configured to engage a latching hook of a structure. In the example shown, two catches 153 extend outwardly from the connection end 147 of the housing 141. One of the catches 153 is located at the first end 145 of the connection end 147 and the other of the catches 153 is located at the second end 146 of the connection end 147. In other implementations, the catches 153 may be located anywhere along the connection end 147.

In certain implementations, the mounting arrangement 150 includes a ramped stop 155 that extends outwardly from the connection end 147. The ramped stop 155 is tapered to that a ramped surface of the stop 155 faces partially towards the first surface 142. In certain examples, the ramped stop 155 is disposed between the catches 153. In the example shown, the ramped stop 155 is disposed at a central region of the connection end 147. In other examples, the mounting arrangement 150 may define multiple ramped stops 155.

FIGS. 8-12 illustrate an example enclosure arrangement 100 in which one or more of the splitter modules 140 can be disposed. The enclosure arrangement 100 is configured to connect at least one feeder fiber 170 to at least two drop fibers 175. The enclosure arrangement 100 defines one or more input ports 108 leading to an interior 107. In certain examples, the enclosure arrangement 100 includes at least two input ports 108 to support looping the feeder fiber 170 within the enclosure 100. In the example shown, the enclosure arrangement 100 includes four input ports 108. The enclosure arrangement 100 also defines two or more output openings 128 leading to the interior 107. Optical adapters 130 (e.g., ruggedized adapters) can be disposed at the output openings 128 to receive the drop fibers 175.

The feeder fiber 170 is routed into the enclosure 100 through the input port 108. The feeder fiber 170 is optically coupled (e.g., spliced) to the splitter input fiber 161 of a splitter module 140 disposed within the enclosure 100. The splitter output pigtails 165 of the splitter module 140 are routed to inner ports 132 of the optical adapters 130. Connectorized ends 176 of drop fibers 175 can be plugged into outer ports 131 of the optical adapters 130 to connect the drop fibers 175 to the feeder fiber 170. In some implementations, the optical adapters 130 are disposed in one or more rows. In certain implementations, each row of adapters 130 is associated with a splitter module 140 so that the output pigtails 165 of the splitter module 140 are plugged into the inner ports 132 of the optical adapters 130. In the example shown, the enclosure 100 includes two rows of optical adapters 130 (see FIG. 8) and carries two splitter modules 140 (see FIG. 9).

In some implementations, the feeder fiber 170 is coupled to the splitter input fiber 161 at a splice tray 115. For example, one or more splice trays 115 can be disposed at a splice region 114 within the enclosure 110. In an example, the splitter input fiber 161 can be routed from the splitter housing 141 to the splice tray 115 at which an unconnectorized end 162 of the input fiber 161 is spliced to the feeder fiber 170. In other implementations, the feeder fiber 170 is otherwise coupled to the splitter input fiber 161 (e.g., using connectors and an optical adapter).

Figure 10:
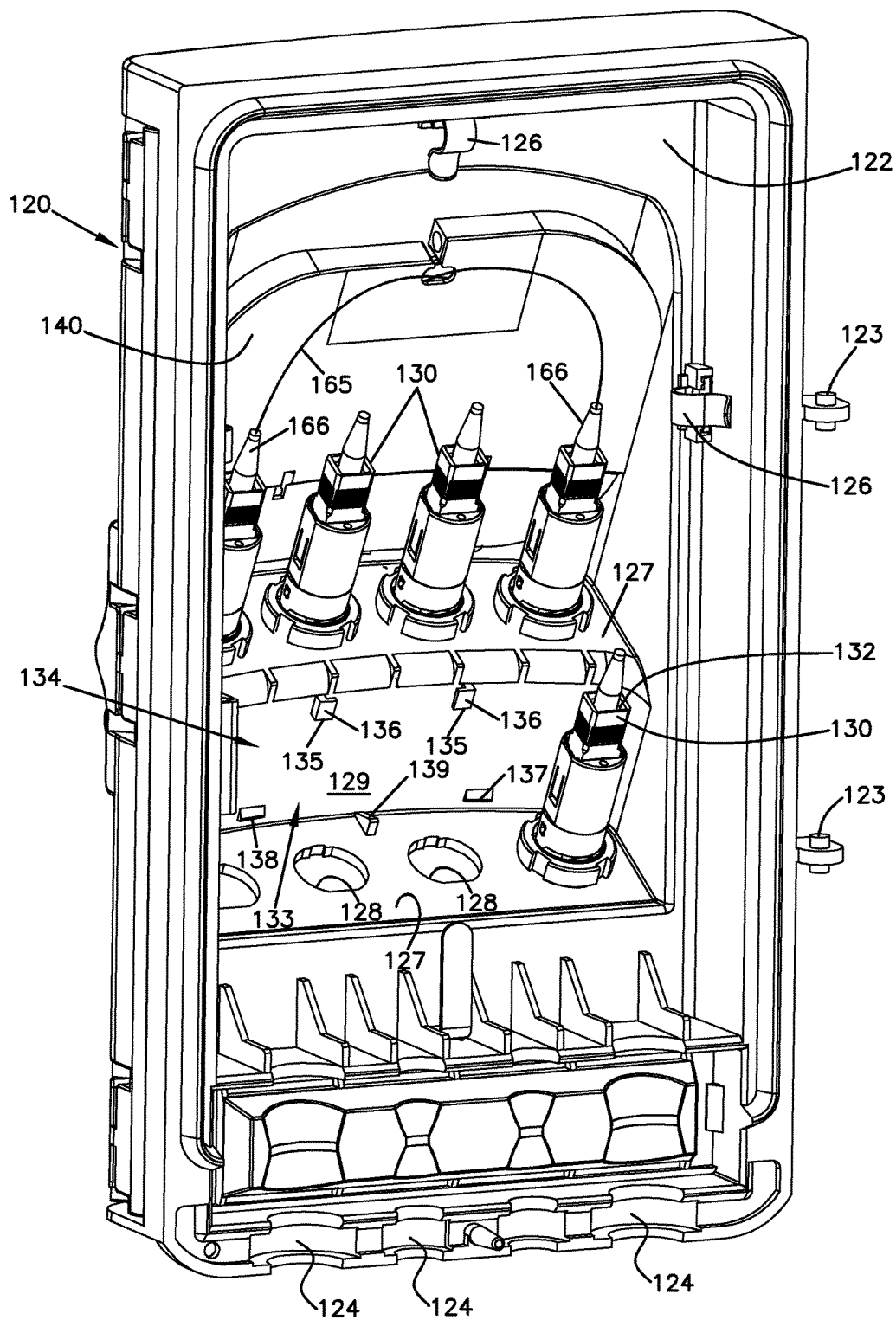
FIG. 10 is a perspective view of an interior side of a cover of the enclosure arrangement of FIG. 8.
Figure 11:
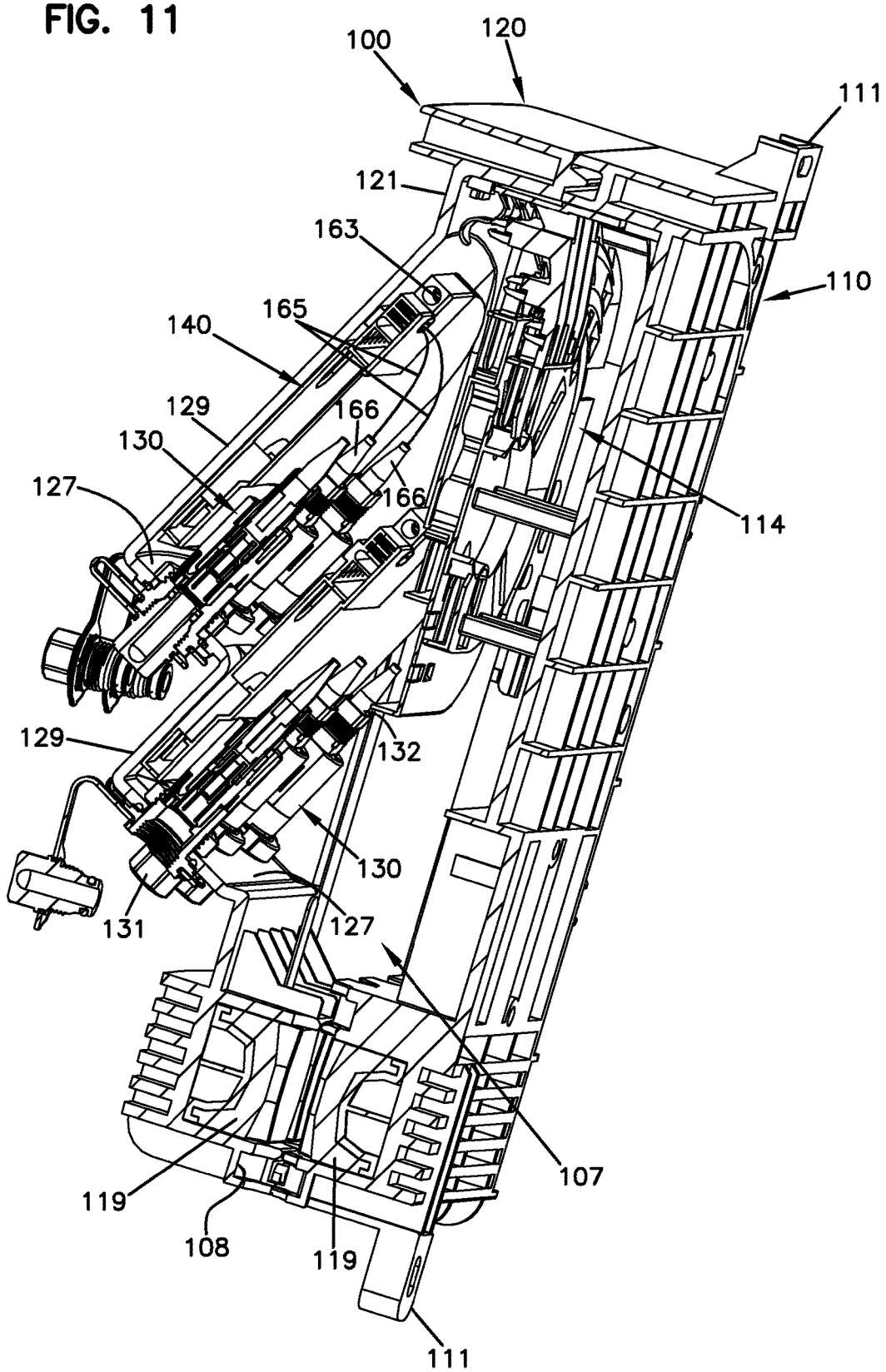
FIG. 11 is a cross-sectional view of the cover of FIG. 10 taken along the 11-11 line of FIG. 9.

As shown in FIG. 10, the enclosure 110 is configured to receive one or more of the splitter modules 140. For example, the enclosure 110 can define one or more pockets 133 at which the splitter modules 140 can be mounted. The enclosure 110 defines a mounting arrangement 134 at each pocket 133 to engage the splitter mounting arrangement 150 of the splitter module 140. In some implementations, the mounting arrangement 134 includes one or more retaining arms 135 having laterally extending tabs 136. In the example shown, the mounting arrangement 134 includes two retaining arms 135 that have tabs 136 extending towards each other. In other implementations, however, the mounting arrangement 134 can have a greater or lesser number of retaining arms 135.

In some implementations, the mounting arrangement 134 includes one or more ramped tabs 137 that protrude from an inner wall of the enclosure 100. The ramped tabs 137 define shoulders 138. In the example shown, the mounting arrangement 134 includes two ramped tabs 137. In other examples, the mounting arrangement 134 can have a greater or lesser number of ramped tabs 137. In some implementations, the mounting arrangement 134 also includes a ramped stop 139. A ramped surface of the stop 139 can be oriented to partially face an interior wall of the enclosure 100. In the example shown, the ramped stop 139 is disposed between the ramped tabs 137.

To mount the splitter module 140 at the pocket 133 of the enclosure 100, the connection end 147 of the splitter module 140 is moved into the pocket 133 until the mounting arrangement 134 of the enclosure 100 engages the mounting arrangement 150 of a splitter module 140. For example, the catches 153 of the splitter module 140 are configured to slide over the ramped tabs 137 of the enclosure until the shoulders 138 of the ramped tabs 137 engages the abutment surfaces 154 of the catches 153. The ramped stop 155 of the splitter module 140 abuts the ramped stop 139 of the enclosure 100 to aid in retaining the splitter module 140. For example, the engagement between the ramped stops 139, 155 inhibits the catches 153 from moving sufficiently to disengage the abutment surfaces 154 from the shoulders 138. In some implementations, the tabs 136 of the retaining arms 135 slide into the apertures 151 of the splitter module 140 as the splitter module 140 is moved (e.g., slid) into the pocket 133. The tabs 136 move along the aperture 151 until the tabs 136 slide beneath the ledges 152. Engagement between the tabs 136 and the ledges 152 inhibits movement of the splitter module 140 away from the enclosure 100.

Figure 9:
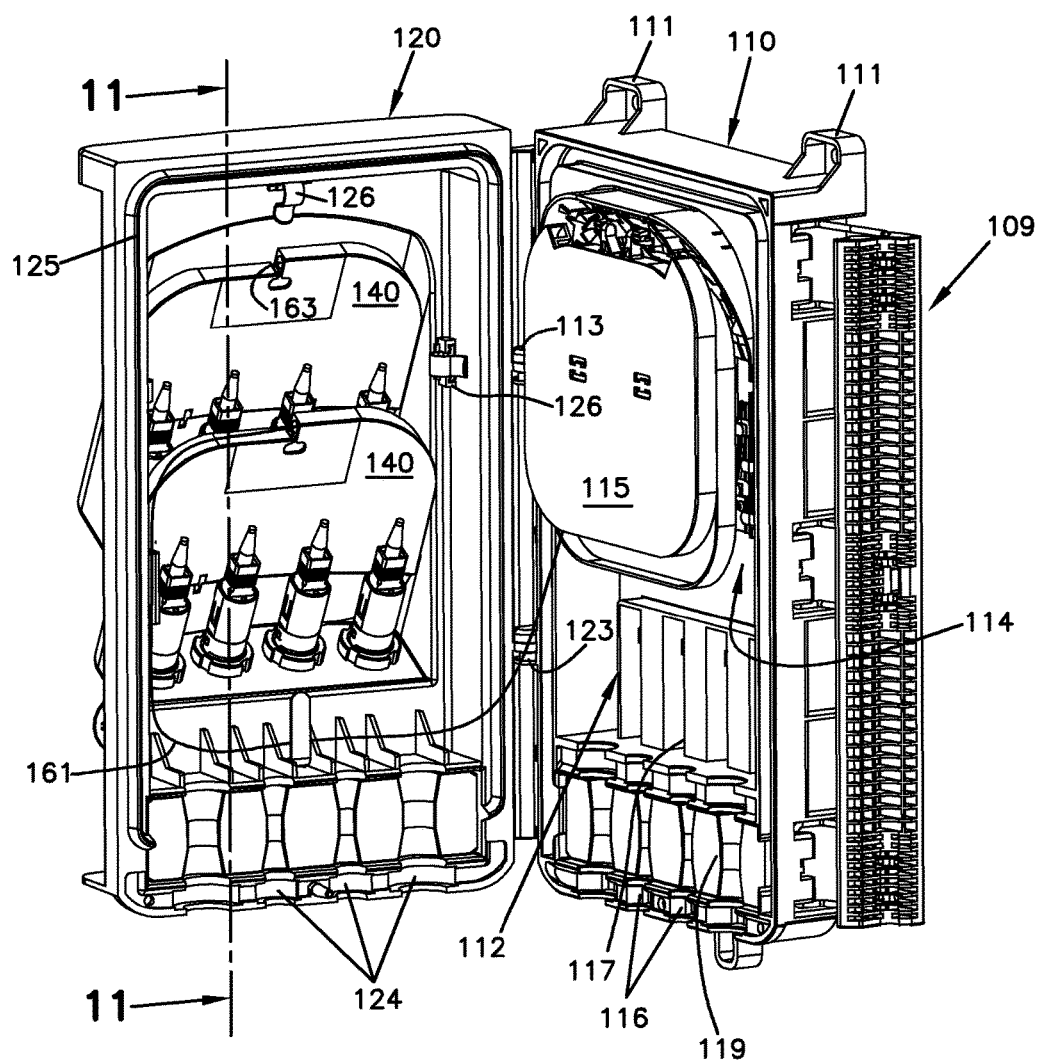
FIG. 9 is a perspective view of the enclosure arrangement of FIG. 8 arranged in the open position.

As shown in FIG. 9, the enclosure 100 includes a base 110; and a cover 120 coupled to the base 110. The enclosure 100 has a front 101, a rear 102, a top 103, a bottom 104, a first side 105, and a second side 106. In the example shown, the base 110 defines the rear 102 of the enclosure and the cover 120 defines the front 101 of the enclosure 100. However, the terms "front," "rear," "top," and "bottom" are not intended to be limited and are used for clarity. The enclosure 100 can be disposed in any desired orientation.

The base 110 is configured to be mounted to a structure (e.g., a wall or other surface). For example, the base 110 can include one or more mounting tabs 111. The cover 120 is configured to move relative to the base 110 between a closed position and an open position. The cover 120 and the base 110 cooperate to define an interior 107 when the cover 120 is in the closed position (see FIG. 8). The base 110 and cover 120 cooperate to activate an enclosure gasket 125 when closed. The enclosure gasket 125 inhibits ingress of contaminants through a seam between the base 110 and the cover 120. User access to the enclosure interior 107 is provided when the cover 120 is in the open position (see FIG. 9).

In some implementations, the cover 120 is configured to pivot relative to the base 110. For example, the base 110 and the cover 120 can include hinge members 113, 123 that cooperate to define a hinge axis. In other implementations, the cover 120 is otherwise movable relative to the base 110. In some implementations, the cover 120 can be locked in the closed position. For example, a clasp arrangement 109 can hold the cover 120 in the closed position relative to the base 110. In other implementations, the cover 120 can be latched relative to the base 110. In still other implementations, a pad lock or other type of lock can retain the cover 120 in the closed position.

In some implementations, the optical adapters 130 are carried by the cover 120 so that inner ports 132 of the adapters 130 are accessible from an interior side 122 of the cover 120 and outer ports 131 of the adapters 130 are accessible from an exterior side 121 of the cover 120. In certain implementations, the adapters 130 are angled so that the outer ports 131 face towards the input ports 108 of the enclosure 100. For example, the cover 120 can define one or more mounting surfaces 127 and one or more contoured surfaces 129. The mounting surfaces 127 define the output openings 128. In certain examples, the mounting surfaces 127 are angled towards the input openings 108. The contoured surfaces 129 taper from the mounting surfaces 127 to a remainder of the exterior side 121 of the cover 120.

In some implementations, the splitter modules 140 are carried by the cover 120. For example, the inner side 122 of the cover 120 may define one or more pockets 133 at which the mounting arrangements 134 are disposed. In certain implementations, each pocket 133 is disposed between a row of the output ports 128 and the interior side 122 of the contoured surface 129. The splitter module 140 is mounted at the pocket 133 so that the first major surface 142 faces the base 110 and the second major surface 142 faces the interior side 122 of the cover 120. The splitter module 140 is shaped to fit within the pocket 133. For example, the convex contour of the second surface 143 of the splitter module 140 fits against the interior side 122 of the contoured surface 129 (see FIG. 11). The concave contour of the first surface 142 of the splitter module 140 accommodates the optical adapters 130 (see FIG. 11).

In some implementations, the cover 120 defines multiple pockets 133. In certain examples, the cover 120 defines a pocket 133 for each row of optical adapters 130. In the example shown in FIG. 9, the cover 120 defines two pockets 133 and two rows of optical adapters 130. A splitter module 140 is disposed at each pocket 133. Output pigtails 165 from each splitter module 140 are plugged into the adapters 130 in the respective row. In an example, the splitter modules 140 are disposed and oriented so that their minor axes A2 extend parallel to each other (see FIG. 11).

The connection end 147 of the splitter module 140 faces the mounting surface 127 and the free end 148 of the splitter module 140 extends into the enclosure interior 107 (see FIG. 11) when the splitter module 140 is disposed at the pocket. In certain examples, components of the mounting arrangement 134 are disposed on the interior side 122 of the contoured surface 129. For example, as shown in FIG. 10, the ramped tabs 137 and the retaining arms 135 can be disposed at the interior side 122 of the contoured surface 129. In the example shown, the ramped stop 139 is disposed at the mounting surface 127 with the ramped surface facing the contoured surface 129.

The splitter input fiber 161 extends from the free end 148 of the splitter module 140 towards the base 110. The output pigtails 165 extend from the outlet opening 167 at the free end 148. Connectorized ends 166 of the output pigtails 165 are plugged into the inner ports 132 of the adapters 130. The splitter input fiber 161 extends from the inlet opening 163 at the free end 148 of the splitter module 140 towards the base 110. The cover 120 and/or the base 110 include fiber routing members (e.g., hooks, retaining tabs, etc.) 126 that facilitate routing the splitter input fibers 161 from the splitter modules 140 to a splice tray 115 disposed at the base 110.

In certain examples, the splitter input fiber 161 is longer than the output pigtails 165. In certain examples, the splitter input fiber 161 is at least twice as long as the output pigtails 165. In certain examples, the splitter input fiber 161 is at least three times as long as the output pigtails 165. In certain examples, the splitter input fiber 161 is at least four times as long as the output pigtails 165. In certain examples, the splitter input fiber 161 is at least five times as long as the output pigtails 165.

In some implementations, the base 110 defines a splice region 114 at the interior side 112. The splice region 114 is configured to hold one or more splice trays 115. In some implementations, the splice region 114 is located closer to the top 103 of the enclosure 100 than to the bottom 104 (see FIG. 9). The splice trays 115 enable the splitter input fibers 161 to be spliced to incoming feeder fibers 170.

In some implementations, an interior side 112 of the base 110 includes an anchoring region 117 at which a feeder cable can be anchored after entering through an input port 108. The feeder cable includes the feeder fiber 170 and a jacket and/or a strength layer that can be attached to the base 110 at the anchoring region 117. The anchoring region 117 is disposed beneath the splice region 114. In some implementations, the input ports 108 are defined by the base 110. In other implementations, the base 110 and the cover 120 cooperate to define the input ports 108. In the example shown in FIG. 9, the base 110 and the cover 120 each define a partial port opening 116, 124 that align to form the input ports 108 when the cover 120 is closed relative to the base 110 (see FIG. 11).

In certain implementations, the base 110 and the cover 120 cooperate to activate a gel block 119 or other seal at the input ports 108. The gel block 119 inhibits ingress of contaminants into the enclosure 100 through the input ports 108. In some implementations, the base 110 defines a sealing pocket 118 in which the gel block 119 seats. In certain implementations, the cover 120 also can define a sealing pocket aligned with the base sealing pocket 118. In certain examples, the cover 120 and base 110 compress two gel blocks 119 together when closed. The feeder cables are routed between the gel blocks 119.

To connect the feeder fiber 170 to the drop fibers 175, a feeder cable is routed into an enclosure 100 through an input port 108. A feeder fiber 170 is routed from a terminated end of the feeder cable to a splice tray 115 carried by the base. Optionally, a cable jacket and/or strength member of the feeder cable can be anchored to the base 110 of the enclosure 100. A splitter module 140 is mounted to an inner side 122 of the cover 120 of the enclosure 100. Connectorized ends 166 of the output pigtails 165 of the splitter module 140 are plugged into inner ports 132 of optical adapters 130 carried by the cover 120. An unconnectorized end 162 of the splitter input fiber 161 is routed from the cover 120 to the splice tray 115 at the base 110. The unconnectorized end 162 of the splitter input fiber 161 is spliced to the unconnectorized end of the feeder fiber 170 and the splice is stored at the splice tray 115. Drop fibers 175 are connected to the feeder fiber 170 by plugging connectorized ends 176 of the drop fibers 175 into the outer ports 131 of the optical adapters 130.

The above specification, examples and data provide a complete description of the manufacture and use of the composition of the invention. Since many embodiments of the invention can be made without departing from the spirit and scope of the invention, the invention resides in the claims hereinafter appended.

LIST OF REFERENCE NUMERALS AND CORRESPONDING FEATURES 100 enclosure arrangement
101 front
102 rear
103 top
104 bottom
105 first side
106 second side
107 interior
108 input ports
109 clasp arrangement
110 base
111 mounting tabs
112 interior side
113 hinges
114 splice region
115 splice trays
116 partial port openings
117 anchor location
118 sealing pocket
119 gel block
120 cover
121 exterior surface
122 interior surface
123 hinges
124 partial port openings
125 enclosure gasket
126 cable routing structure
127 mounting surface
128 output openings
129 contoured surface
130 ruggedized adapters
131 outer port
132 inner port
133 pocket
134 mounting arrangement
135 retaining arms
136 tabs
137 ramped tab
138 shoulder
139 ramped stop
140 splitter module
141 housing
142 first major surface
143 second major surface
144 circumferential edge
145 first end
146 second end
147 attachment end
148 free end
150 splitter mounting arrangement
151 retaining apertures
152 retaining flanges
153 catches
154 abutment surfaces
155 ramped stop
156 first part
157 second part
158 interior
159 fiber routing region
160 splitter
160a first end of splitter
160b second end of splitter
161 input fiber
162 unconnectorized end
163 inlet opening
164 inlet channel
165 output pigtail
166 connectorized end
167 outlet opening
168 outlet channel
169 spool arrangement
170 feeder cable
171 unconnectorized end
175 drop cable
176 connectorized end
181 grip member
182 splice holder location
185 latch arms
186 recesses
A1 major axis
A2 minor axis

What is claimed is:

1. An enclosure arrangement comprising:
a base defining a splice region;
a cover coupled to the base to move between a closed position and an open position, the cover and the base cooperating to define an interior when the cover is in the closed position, the cover providing access to the interior when in the open position, the cover defining a plurality of separate pockets at an inner side of the cover;
a plurality of ruggedized adapters disposed on the cover, each ruggedized adapter having a first port accessible from the inner side of the cover and a second port accessible from an outer side of the cover; and a splitter module disposed in one of the pockets at the inner side of the cover, each splitter module including a splitter disposed in a splitter housing, an input fiber coupled to one end of the splitter, and a plurality of splitter output pigtails coupled to another end of the splitter, the input fiber being routed to the splice region of the base, the splitter output pigtails having connectorized ends.

2. The enclosure arrangement of claim 1, wherein a respective splitter module is disposed in each of the pockets.

3. The enclosure arrangement of claim 2, wherein the ruggedized adapters are disposed on the cover in rows, and wherein the rows and pockets are configured in an alternating pattern.

4. The enclosure arrangement of claim 1, wherein the ruggedized adapters are angled relative to the cover to partially face an input port and wherein the splitter module is angled relative to the cover to partially face the input port.

5. The enclosure arrangement of claim 1, wherein the splitter module has a front and a rear, and wherein an intermediate portion of the splitter housing is disposed farther rearward than ends of the splitter housing.

6. The enclosure arrangement of claim 1, wherein the splitter housing includes two major surfaces spaced from each other by a circumferential edge, wherein the major surfaces have a major axis and a minor axis, and wherein the major surfaces are curved about the minor axis.

7. The enclosure arrangement of claim 1, wherein the base defines an anchor location at which a feeder cable can be anchored, and wherein the enclosure arrangement further comprises a gasket held between the base and the cover to enable ingress of the feeder cable and to inhibit ingress of contaminants, wherein the cover is configured to cooperate with the base to activate the gasket.

8. The enclosure arrangement of claim 1, further comprising a second splitter module carried by the cover, the second splitter module extending parallel to the first splitter module.

9. The enclosure arrangement of claim 1, further comprising a cable routing structure carried by the cover to direct the input fiber to the splitter module.

10. The enclosure arrangement of claim 1, wherein a length of each splitter output pigtail is shorter than a length of the input fiber.

11. The splitter module of claim 1, wherein the cover includes a first mounting arrangement at the inner side and the splitter module includes a second mounting arrangement.

12. A splitter module comprising:
a housing defining an interior, the housing including a first major surface and a second major surface, the housing having a major axis extending along the major surfaces from a first end of the housing to a second end of the housing, the housing also having a minor axis extending along the major surfaces orthogonal to the major axis, the housing being curved about the minor axis;
a splitter disposed within the interior of the housing;
an input fiber coupled to a first end of the splitter, the input fiber extending out of the housing; and
a plurality of output pigtails coupled to a second end of the splitter, each output pigtail extending out of the housing.

13. The splitter module of claim 12, wherein the splitter extends along the major axis of the housing.

14. The splitter module of claim 12, wherein the housing includes a first part and a second part that cooperate to define the interior.

15. The splitter module of claim 12, wherein the housing includes a fiber spool arrangement disposed within the interior that enables the output pigtails to exit the housing in at least two different directions.

16. The splitter module of claim 12, wherein the minor axis of the housing extends between an attachment end of the housing and a free end of the housing, wherein the input fiber enters the housing through an inlet opening at the free end.

17. The splitter module of claim 16, wherein the input fiber is tangentially routed into the housing through an inlet channel.

18. The splitter module of claim 16, wherein the output pigtails exit the housing at an outlet opening that is inwardly offset from the free end of the housing.

19. A method of connecting a feeder fiber to a plurality of drop fibers, the method comprising:
routing the feeder fiber into an enclosure having a base and a cover including opening the cover to expose partial port openings on the base and the cover that cooperate to define an input port, wherein the feeder fiber extends through the input port when the cover is closed;
routing the feeder fiber to a splice tray carried by the base at an interior side of the base;
mounting a splitter module to an interior side of the cover;
routing an input fiber of the splitter module to the splice tray; and
plugging connectorized ends of splitter output pigtails into inner ports of ruggedized adapters carried by the cover, wherein the splitter module, the ruggedized adapters, and the splitter output pigtails are carried together by the cover.

20. The method of claim 19, further comprising splicing the feeder fiber to the input fiber at the splice tray.

21. The method of claim 19, further comprising activating a sealing arrangement by moving the cover relative to the base to a closed position.

* * * * *